TAPE TRANSPORT WITH INDEPENDENTLY OPERABLE DRIVE
AND BRAKE MEANS AT RECORD AND REPRODUCE STATIONS

Filed July 20, 1964 3 Sheets-Sheet 1

INVENTORS
David L. Nettleton
James E. Palmer
BY
ATTORNEYS

INVENTORS
David L. Nettleton
James E. Palmer
BY
[signature]
ATTORNEYS

INVENTORS
David L. Nettleton
James E. Palmer
BY
[signature]
ATTORNEYS

United States Patent Office 3,393,277

Patented July 16, 1968

3,393,277

TAPE TRANSPORT WITH INDEPENDENTLY OPERABLE DRIVE AND BRAKE MEANS AT RECORD AND REPRODUCE STATIONS

David L. Nettleton, Westmont, N.J., and James E. Palmer, Philadelphia, Pa., assignors, by mesne assignments, to DASA Corporation, Andover, Mass., a corporation of Massachusetts Filed July 20, 1964, Ser. No. 383,739

7 Claims. (Cl. 179—100.2)

ABSTRACT OF THE DISCLOSURE

This invention relates specifically to a magnetic recorder utilizing an endless loop of tape in which data may be entered sporadically and removed at a substantially constant rate. The contemplated recorder contemplates the use of separate recorder and transcriber heads in conjunction with normally independently operable drive and brake mechanism of a particular design so that recording and transcribing may normally be accomplished independently. A control circuit to prevent damage to the tape and to ensure transcription of the last recorded data is also contemplated.

The present invention relates to tape transports and more particularly to tape transport mechanisms for recording, storing, and transcribing intelligence on tape.

A purpose of the invention is to record intelligence on a tape, pass the tape into a loop for storage and then transcribe the intelligence from the tape.

A further purpose is to use a magnetic tape and store the intelligence on the tape in the form of magnetic impulses.

A further purpose is to achieve a speed conversion between the speed at which the intelligence is recorded and the speed at which the intelligence is transcribed.

A further purpose is to use a continuous loop tape.

A further purpose is to record and transcribe the intelligence at a high rate of speed.

A further purpose is to provide a variable length storage loop in a tape to compensate for the difference between the speed at which the information is recorded and the speed at which the information is transcribed.

A further purpose is to stop and start a tape in a tape transport simply, dependably and quickly.

A further purpose is to provide a greater flexibility in processing a magnetic tape.

A further purpose is to store intelligence on a magnetic tape to provide for time differences in transmittal and receipt of intelligence.

Further purposes appear in the specification and in the claims.

In the drawings, we have chosen to illustrate one only of the numerous embodiments in which our invention may appear, selecting the form shown from the standpoints of convenience in illustration, satisfactory operation and clear demonstration of the principles involved.

Figures 1, 5:
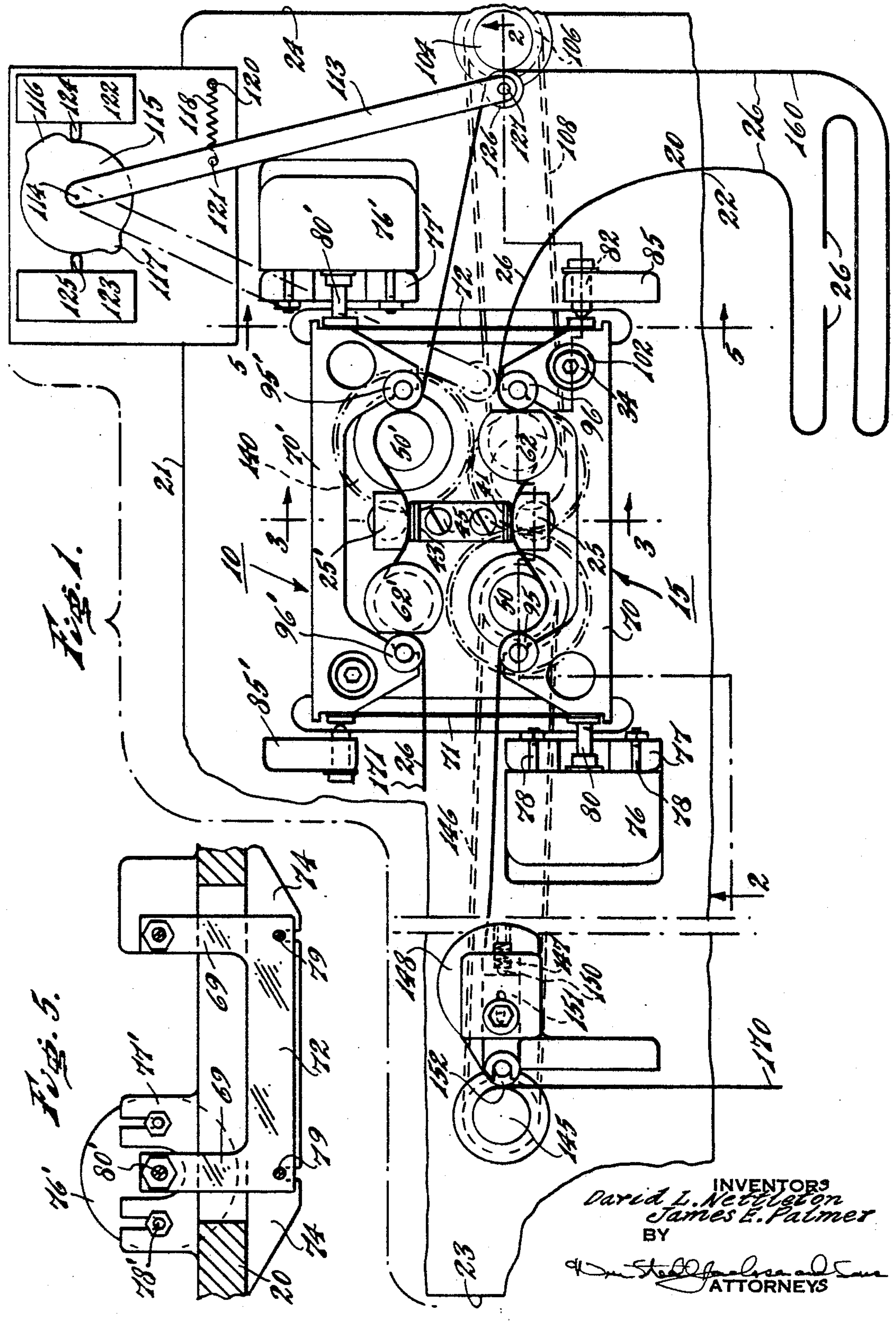
FIGURE 1 is a plan view of the device of the invention with the base partly broken away.
FIGURE 5 is a section taken on the line 5—5 of FIGURE 1.

Describing in illustration but not in limitation and referring to the drawings:

In the communications art, it is often necessary to store electronic intelligence or signals between receipt and transmittal at a given location. In many instances, it may be further desirable to transmit the intelligence at a different rate of speed from that at which it is received. In the prior art, punched or printed paper tapes read by means of photocells or mechanical fingers were used for storing the intelligence and for subsequently imparting the intelligence to a transmitter. These tapes were expendable and had to be discarded after a single use, and suitable mechanisms were available for using such tapes. Considerable energy was necessary to punch the tape, thus limiting the speed at which the tape could be run. Furthermore, the paper tape had to be advanced in steps in order to stop the tape while the punch was being passed through the paper or while the punched information was subsequently being read. This step type of advancement, along with the time necessary to physically punch the paper, severely limited the tape speed to in most instances approximately 10 inches per second and this in turn limited the speed at which the intelligence could be recorded and transmitted. Also, the mechanism for punching the tape was complicated and bulky, and the voluminous amount of paper tape used was objectionable because of costs and space considerations.

In the present invention, intelligence is recorded, stored, and transcribed at a very high speed compared to the prior art. In addition, the recording and transcribing speeds can be different. To achieve these results, a continuous loop of magnetic tape is recorded with intelligence, stored in a storage loop, and then transcribed at a speed which may be the same, or different than the recording speed. Rates of speed at which the tape can be moved through the recorder and transcriber can be of the order of for instance, 50 inches per second with no need for periodic stopping. The tape is erased after being transcribed so that it is ready for re-use and re-recording, and the tape may be re-used a great number of times.

The device of the invention is comprised of a recorder 10 and a transcriber 15 including braking and driving means, a continuous loop tape passing through the recorder and transcriber, means for controlling operation of the recorder and transcriber, and means for controlling the loop containing the stored intelligence between the recorder and transcriber.

In the device of the invention, the recorder 10 and transcriber 15 are substantially identical. For purposes of simplicity and clarity the transcriber 15 will be referred to in the detailed description and drawings, and the recorder 10 will be identified in the drawings by adding a prime to the reference numerals of the identical element. In the description of the operation of the device, reference will be made to these prime numbers.

Figure 2:
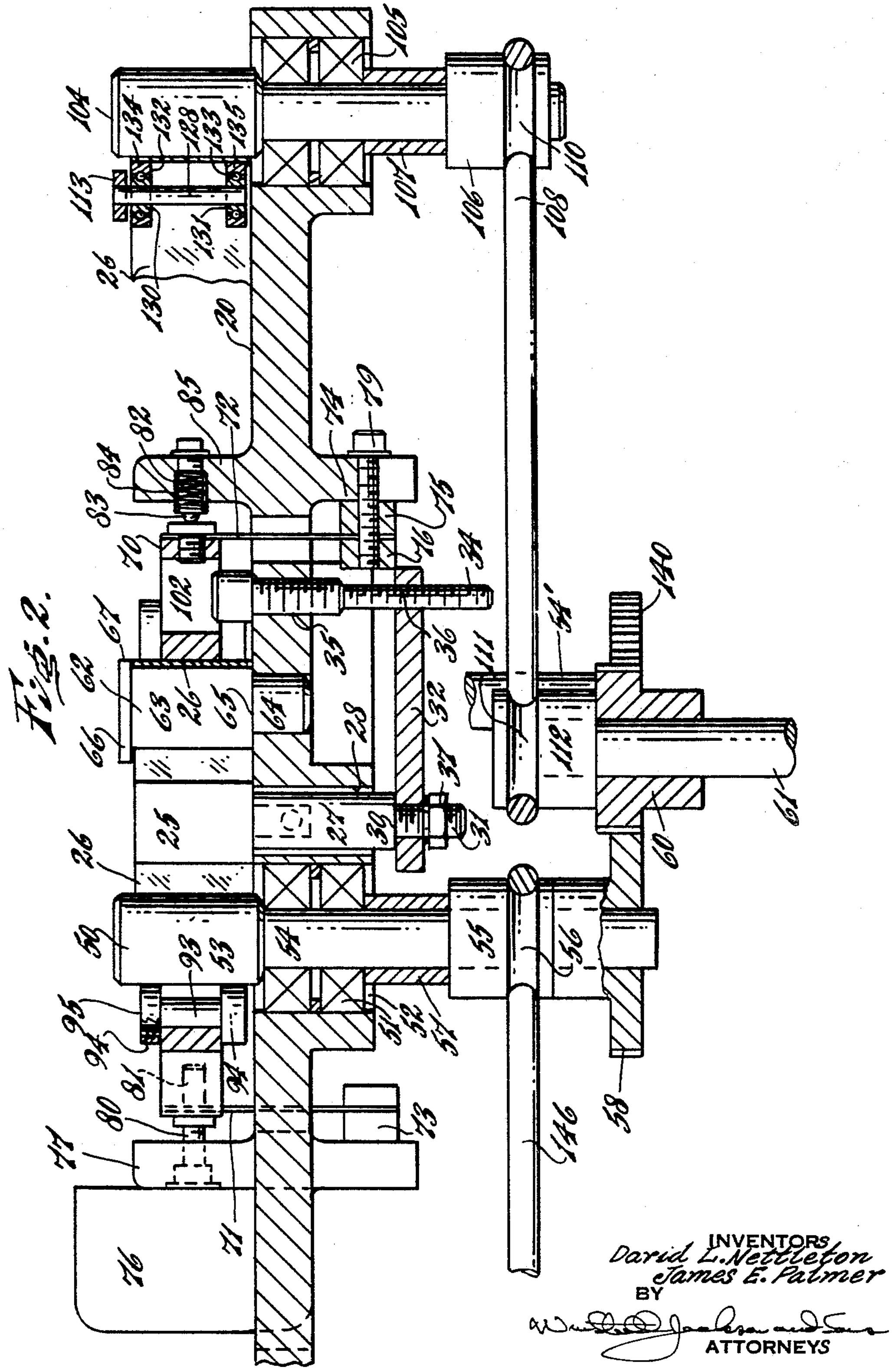
FIGURE 2 is an enlarged vertical section taken on the line 2—2 of FIGURE 1.
Figure 3:
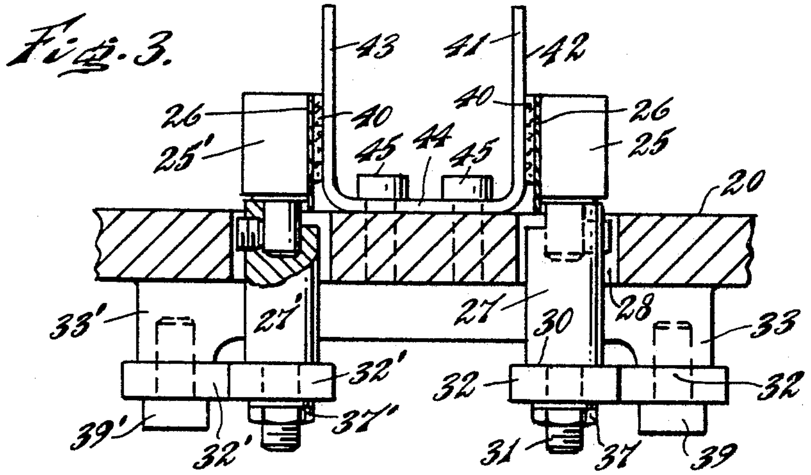
FIGURE 3 is an enlarged transverse vertical section taken on the line 3—3 of FIGURE 1.

Considering the tape transport of the invention and referring to FIGURES 1 and 2, there is shown a base 20 suitably in the form of a flat rectangle having longitudinal sides 21 and 22 and transverse ends 23 and 24. The base has a plurality of openings which receive and support specific elements of the recorder and the transcriber. A transcriber head 25 and a recorder head 25' are supported in the base 20. The recorder head 25' and transcriber head 25 respectively impart and receive magnetic impulses in the well known prior art manner to and from a tape 26. The tape 26 can be of any magnetizable flexible material. The transcriber head 25 is supported on a shaft 27 which extends through an opening 28 in the base to a position below the base. The shaft 27 has a shoulder 30 formed with an integral reduced portion 31 preferably circular in cross section which extends through a spring plate 32. Spring plate 32 is fixed to boss 33 by cap screws 39 as best seen in FIGURE 3. An adjustable threaded screw 34 passes through tapped hole 35 in base 20 and engages a threaded hole 36 in the spring plate 32. The reduced portion 31 of the recording head support is held to the spring plate 32 by nut 37. By means of an adjustment of differential threaded screw 34, the transcriber head 25 can be aligned to extend in proper transcribing relationship to the tape 26, which is usually normal to the length of the tape.

A suitable pressure pad 40 is spring-loaded by a leaf spring 41 in the form of a U having arms 42 and 43 and a base 44 which is held to base 20 by cap screws 45. The pressure pad is suitably of felt and adhesively secured to the arms 42 and 43. The recording head 25′ is supported from the base in the same manner as transcribing head 25.

A transcriber drive capstan 50 is journalled in the base by ball bearings 51 located in circular opening 52 in base 20. The drive capstan 50 has an upper cylindrical tape drive portion 53 and a lower shaft portion 54. The upper and lower portions 53 and 54 are circular in cross section. The upper cylindrical drive portion 53 extends above the base and the lower drive shaft portion 54 extends below the base. A pulley 55 having an annularly extending groove of semi-circular cross section 56 is keyed on shaft 54 and positioned longitudinally thereon by a spacer 57. Gear 58 is keyed on shaft 54 and is in engagement with pinion 60 keyed on drive shaft 61 connected to a synchronous motor or the like of any suitable type.

A transcriber stationary brake post 62 having a cylindrical portion 63 and a reduced shaft portion 64 integral therewith extends from the base 20. Shoulder 65 rests in contact with the base 20 and reduced shaft portion 64 engages the base by means of a force fit. A flange 66 extends around capstan 62 at the top thereof, the flange having a cutaway portion at 67.

A transcriber yoke 70 is supported in a plane parallel to the base 20 by leaf springs 71 and 72 which extend normal to the plane of the base. Leaf springs 71 and 72 are anchored at abutments 73 and 74 respectively which depend from the base and are suitably integral therewith. Cap screws 79 extend through holes in the abutments 73 and 74 and engage spacers 75 and nut 76 which secure the leafs 71 and 72 respectively in firm clamping relation at the lower end. It is obvious that the upper end of the leafs 71 and 72 are free to flex in a plane parallel to that of the plane of the base 20. The leaf springs 70 and 71 are each divided into arms 69 which are free to move independently of one another. The leaf springs 71 and 72 at the upper ends of their arms 69 are secured to opposed ends of the yokes 70 and 70′ by suitable fastening means. Thus, the yokes 70 and 70′ are supported rigidly vertically while free to flex horizontally. Also the yokes 70 and 70′ are free to move independently of one another.

A solenoid 76 having suitable electrical connections is anchored to a bifurcated arm 77 integral with the base by means of bolts 78. Solenoid shaft 80 extends from the solenoid and is forced longitudinally out of the solenoid as well known when the solenoid is energized. The shaft 80 is threaded into a tapped hole in the yoke at 81. At the opposite end of the yoke from solenoid 76, a helical compression spring 82 surrounds slidable pin 83 which slides in opening 84 in post 85, the opening 84 being plugged at one end by a cap screw. Hence, the pin 83 bears against the yoke 70 under the force of the spring 82.

By virtue of this suspension of the yoke 70, solenoid 76 when energized extends shaft 80 from the solenoid and forces yoke 70 toward post 85 against the force of spring 82. When solenoid 76 is deenergized, shaft 80 is free to retract within the solenoid 76 and compression spring 82 forces pin 83 against yoke 70 moving the yoke toward a post 77. Leaf springs 71 and 72 through arms 69 support the yoke in a manner described to allow this horizontal movement without any substantial resistance while at the same time restricting the vertical movement of the yoke 70.

Figure 4:
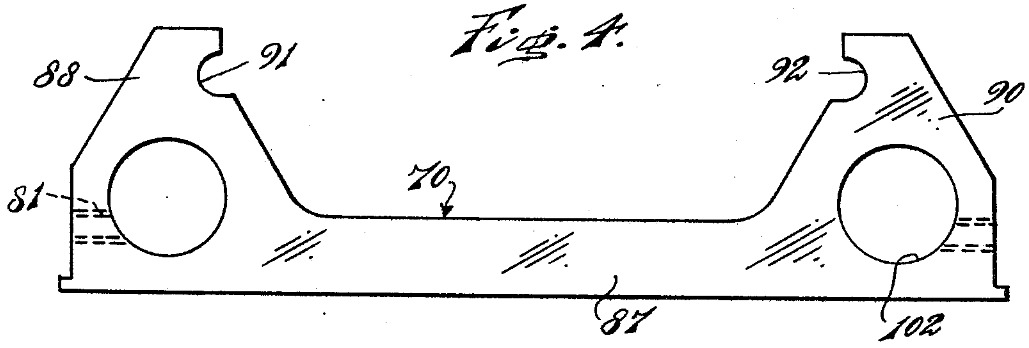
FIGURE 4 is an enlarged plan view of the transcriber or recorder yoke of the invention.

As seen in FIGURE 4, yoke 70 has a beam portion 87 and arm portions 88 and 90 which have on their opposed inner faces semi-circular bearing surfaces 91 and 92 which journal shafts 93 of drive capstan pinch roller 95 and brake post shoe 96 respectively. Drive capstan pinch roller 95 is of spool shape and has ball bearing rolls 94 which are journalled on the shaft 93. Brake post shoe 96 is similar in design to roller 95, except that it has no ball bearings. The distance between the bearing surfaces 91 and 92 of yoke 70 is such that when they journal rollers 95 and 96, there will be but slight clearance between the transcriber drive capstan 50 and the transcriber drive capstan pinch roller 95 on one hand if transcriber yoke 70 is toward post 77 or, on the other hand, there will be but slight clearance between transcriber brake shoe 96 and the transcriber brake post 62 if the yoke is shifted toward post 85. Circular opening 102 extends through the yoke 70 and provides adjustment access to threaded screw 34.

A storage loop drive capstan 104 is journalled in base 20 in a manner identical to that of transcriber drive capstan 50. Drive capstan 104 has an annular recess at 109, so that the capstan only contacts the tape at portions 109′ which carry no recorded information. Drive capstan 104 is journalled by roller bearings 105 and has at its lower drive portion, pulley 106 which is spaced from the roller bearings by spacer 107. A flexible belt 108, preferably circular in cross section, engages the annular groove 110 of pulley 106 and groove 111 of pulley 112 which is keyed on drive shaft 61. Capstan 104 will rotate at a slightly greater angular speed than recorder drive capstan 50′ for reasons later explained.

The tape 26 is normally kept in contact with capstan 104 by arm 113 which is pivoted at 114 and has fixed thereto so as to rotate with the arm, a cam 115 having dwells 116 and 117. The arm 113 is biased in a counterclockwise direction as shown in FIGURE 1 by means of helical tension spring 118 anchored to the base 20 at 120 and at the other end to arm 113 at 121. Cam activated limit switches 122 and 123 have followers 124 and 125 respectively in contact with cam 115 and are positioned on opposed sides of the cam. A roller 126 is pivotally supported at 127 on arm 113 and includes a post 128 which extends from the arm 113 and is fixed thereto. Inner races 130 and 131 of ball bearings 132 and 133 are fixed thereon. Outer races 134 and 135 serve as rollers to engage tape 26 and bring it into engagement with the capstan 104.

Recorder drive capstan 50′ is driven from drive pinion 60 on drive shaft 61 by means of gear 140 which is in engagement with pinion 60 and which in turn is keyed on the lower shaft portion of the drive capstan 50′. The gear 140 is slightly larger in diameter than gear 58 which is keyed on the lower shaft portion 54 of transcriber drive capstan 50. Hence, in operation recorder drive capstan 50′ rotates at a slightly lower angular speed than transcriber drive capstan 50. A takeoff drive capstan 145 identical to drive capstans 50 and 50′ is driven through belt 146 which engages groove 56 on pulley 55 of transcriber drive capstan 50. The pulley on the lower shaft portion of the takeoff drive capstan 145 which receives belt 146 is the same size as pulley 55 and has a groove the same size as groove 56. A helical spring 147 engaged in a housing 148 which is bolted to the base 20 exerts a force against pin 150 which bears against sliding block 151 which carries roller 152 which is journalled in the sliding block 151.

In operation, tape 26 is inserted between recorder brake post 62′ and shoe 96′ and then between recorder head 25′ and the pressure pad 40. The tape 26 is then threaded between the recorder drive capstan 50' and the recorder drive capstan pinch roller 95'. Alternatively, the tape 26 can be placed into the recorder by inserting the tape downward simultaneously into the above mentioned elements. The flat portion 67 on the brake captan 62' permits this motion. As best seen in FIGURE 2, the rolls 94 of roller 95 only bear against the tape 26 at the rolls 94, with the shaft 93 of the rollers displaced from the tape 26 and not in contact therewith. Rollers 96, 95' and 96' are identical to roller 95.

The tape is then threaded between storage loop drive capstan 104 and pinch roller assembly 127 at the end of rotating arm 113 which is biased counterclockwise as seen in FIGURE 1. A loop 160 of the tape 26 is then allowed to be deposited into a barrel-like container or the like (not shown) and the end of this loop is then threaded back through the transcriber in an identical manner to that described above relative to the recorder.

The tape 26 then passes over the transcriber drive capstan pinch roller 95 and over roller 152 in contact with takeoff drive capstan 145. The tape 26 continues from 170 in a continuous manner to point 171.

The drive shaft 61 is constantly rotated at uniform speed from a suitable drive motor (not shown). Pinion 60 keyed on shaft 61 engages and constantly drives gear 58 on drive capstan 50. Motion is transmitted to capstan 145 through belt 146 and since the transcriber drive capstan pulley 55 is the same size as the pulley on capstan 145, capstans 50 and 145 will constantly rotate at the same angular speed. Roller 152 will be held in spring engagement by helical compression spring 147 against the drive capstan 145.

Likewise, storage loop drive capstan 104 will be driven constantly from the drive shaft 61 through pulley 112, belt 108, and pulley 106. The capstan 104 will suitably rotate at a speed greater than that of recorder drive capstan 50' since the pinion 60 is smaller than gear 140. Gear 140 on recorder drive capstan 50' is in engagement with pinion 60, so that capstan 50' is constantly rotating. Gear 140 is slightly larger than gear 58 so that recorder drive capstan 50' rotates at a slightly lower speed than the transcriber drive capstan 50.

When transcriber solenoid 76 is energized, shaft 80 will be extended and will force yoke 70 away from solenoid 76 toward post 85 against the force of helical spring 82. Yoke 70 is suspended in a plane parallel to the base 20 by means of the arms 69 of leaf springs 71 and 72 so that the leaf springs themselves present no substantial resistance against this motion. In this position, the roller 95 is held in rolling engagement with the transcriber drive capstan 50 which is rotating in a clockwise direction as seen in FIGURE 1 and tape 26 is pulled through the transcriber head 25 by the frictional force created between the driving capstan 50 and the tape. Meanwhile the yoke 70 at arm 90 is away from the transcriber brake capstan 62 and the tape 26 rolls on roller 96 and freely passes around the transcriber brake capstan 62 and over roller 96.

When recorder solenoid 76' is energized, tape 26 is pulled through the recording head 25' by the operation of the recorder drive capstan 50' and roller 95' in a manner identical to that described in the transcriber 15 in the previous paragraph. The capstan 50' is rotating in a clockwise direction as shown in FIGURE 1.

Under these conditions, the tape is passed from the recorder 10 into the storage loop 160 by the pull exerted by drive capstan 140 on tape 26 under the influence of roller 127 on biased arm 113. Since capstan 50 rotates at a slightly higher speed than capstan 50', when both solenoids 76 and 76' are energized, the tape is passed into the storage loop 160 slower than it is withdrawn.

In the event that it is desired to stop the movement of tape 26 past the recording head 25', the recorder solenoid 76' is deenergized so that shaft 80' of the solenoid 76' no longer exerts any force on yoke 70'. Under this condition helical compression spring 82' exerts a force against yoke 70' forcing the yoke away from post 85' and toward the solenoid 76'. This disengages roller 95' from the drive capstan 50' so that the drive capstan 50' is now free to rotate with respect to the tape 26 without frictionally engaging the tape to any appreciable extent so as to pull the tape 26 past the recording head 25'. Meanwhile roller 96' journalled in the arm of yoke 70' is forced toward the cylindrical portion of the stationary recorder brake post 62', forcing the tape into frictional engagement with the post 62'. Frictional engagement between the tape 26 and the brake post 62' brings the tape 26 to rest in the recorder 10 in a very short period of time.

Likewise, the deenergization of solenoid 76 allows helical compression spring 83 to force the yoke 70 toward the solenoid 76, thus disengaging the roller 95 from the transcriber drive capstan 50 and engaging roller 96 with the transcriber brake post 62, quickly bringing the tape to rest in the transcriber. Suitable controls energize and deenergize 76 and 76' in response to receipt of intelligence from sources remote from the tape transport, and desired transmission from the tape transport.

In normal operation, the storage loop 160 will be formed between the recorder 10 and the transcriber 15 and will be of a sufficient length to allow the tape 26 to pass into engagement with the storage drive capstan 104 before passing back through the transcriber. However, in the event that the loop is so shortened by the condition where the tape 26 continues to pass through the transcriber while the tape is stopped in the recorder so that it is not possible for the tape to remain in contact with the storage loop drive capstan 104, a series of operations occurs. The arm 113 which is pivoted at 114 is rotated clockwise as seen in FIGURE 1, against the bias of spring 118. As the loop 160 continues to shorten, dwell 116 on cam 115 engages follower 124, closing limit switch 122. Closing of limit switch 122 will energize solenoid 76' and move yoke 70' so that roller 95' forces the tape 26 into engagement with recorder drive capstan 50' so that the tape 26 begins feeding through the recording head and into loop 160. Meanwhile, of course, the brake shoe 96' of the recorder is disengaged from the recorder brake post 62' so that the tape 26' is now freely passing into the loop.

Since capstan 50' is rotating slower than capstan 50, the loop 160 continues to shorten but at a much slower rate. As the loop 160 continues to shorten, the arm 113 will continue to be rotated in a clockwise direction as viewed from above into a position shown by the phantom lines 173 in FIGURE 1. This will then bring dwell 117 into engagement with follower 125 closing limit switch 123. Closed limit switch 123 acts along with appropriate electronic safeguards to deenergize transcriber solenoid 76, so that the tape will be stopped at a position which will not incur the loss of stored data. Yoke 70 will then shift, bringing the brake shoe 96 into engagement with the transcriber brake post 62 and disengage the transcriber drive capstan roller 95 from the drive capstan 50. This will stop the passage of tape 26 through the transcriber head 25, thus preventing the tape 26 from being further withdrawn from the loop 160. Meanwhile, of course, the recorder drive capstan 50' is pulling the tape into the loop 160 past recorder head 25'. As the loop 160 increases, arm 113 rotates counterclockwise as seen in FIGURE 1 under the bias of helical spring 118 until dwell 116 releases follower 124 thus opening limit switch 122, limit switch 123 having already opened in similar fashion. In this position the controls which normally govern the movement of solenoids 76 and 76' again come into operation. If the loop 160 continues to increase, it comes into contact with the storage loop drive capstan 104 under the continued influence of arm 113.

It should be understood that the drive capstans 50, 50', 104 and 145 are rotating at all times the device is in operation. Selective movement through the recorder head 25′ and transcriber head 25 is obtained by energization and deenergization of the solenoids 76 and 76′ to bring the proper drive capstans and brake capstans into operation by selectively shifting yokes 70 and 70′.

The storage loop drive capstan 145 acts to suitably remove the tape from the recorder into the storage loop. Pivot arm 113 with roller assembly 27 acts to in one instance hold the tape 26 against the capstan 104 and in another instance to sense the diminution of the storage loop 160 and act in conjunction with external electronics to temporarily control the contact of the tape with the drive capstans and brake posts by energizing and deenergizing the solenoids 76 and 76′.

The drive capstan 145 acts to remove the tape from the transcriber and into the feed loop which includes the continuous loop (not shown) between points 170 and 171 on tape 26. In the event that the tape 26 is stopped from passage through the transcriber, the capstan 145 merely rotates and slides in frictional engagement with the tape 26.

Desirably the recorder drive capstan 50′ rotates at a slightly lower angular speed than the transcriber drive capstan 50 so the tape 26 is fed past the transcriber head at a slightly greater linear speed than past the recorder head. This desirably is to provide for a steady even output of intelligence from the tape transport where the input through the transcriber head is somewhat sporadic. Hence, the loop 160 in addition to storing intelligence serves to act as a buffer for a speed conversion between the recording and transcribing speeds. The device of the invention is thus able to convert from a given recording speed to a lower transcribing speed. However, alternatively, the transcribing speed can be increased over the recording speed by selecting different size gears and pinions. In addition, the passage of the tape through the recording head or the transcribing head can be stopped or started independently of one another so that intelligence can be deposited in or withdrawn from the storage loop at will. Also by means of a continuous loop the tape transport and tape can serve to provide a self-contained unit wherein intelligence can be received, stored and subsequently transmitted or, on the other hand, simultaneously received and transmitted with a speed conversion between the receipt and output of the information. The loop can be suitably of a linear length of for instance 75 feet but lengths of up to 200 feet or beyond can be used.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a tape transport having a base and a sensing head on the base for receiving an intelligence bearing tape, a drive capstan on the base for pulling the tape through the head, a brake post for stopping the tape, and means for selectively engaging the tape with the drive capstan or the brake post comprising a yoke including a beam and arms extending transversely from the beam, bearings in the arms of the yoke, rollers in the bearings, suspension means for the yoke including flat leaf springs mounted at one end on the base and at the other end on opposed ends of the yoke, and means for selectively shifting the yoke to bring selected rollers into engagement with the drive capstan or the brake post.

2. In a recorder utilizing a continuous loop of a flexible magnetic tape as the record medium, a recorder head for imparting magnetic impulses to the tape and a transcriber head for sensing magnetic impulses recorded on the tape by the recorder head, tape transport means comprising:

(a) a recorder drive capstan and a recorder brake post;
(b) first means for selectively bringing either the recorder drive capstan or the recorder brake post into frictional engagement with the tape;
(c) a transcriber drive capstan and a transcriber brake post;
(d) second means for selectively bringing either the transcriber drive capstan or the transcriber brake into frictional engagement with the tape;
(e) driving means for rotating the recorder drive capstan at a first speed and the transcriber drive capstan at a second speed higher than the first speed;
(f) control means, actuable when the transcriber drive capstan is engaged with the tape and the length of tape between the recorder head and the transcriber head reaches a predetermined length, for sequentially engaging the recorder drive capstan with the tape, disengaging the transcriber drive capstan when the last recorded magnetic impulse on the tape is read by the transcriber head, and disengaging the recorder drive capstan.

3. Tape transport means as in claim 2 wherein the control means includes:

(a) a rotatable arm having an end portion over which the tape is drawn from the recorder head to the transcriber head;
(b) spring means for holding the rotatable arm in a first position so long as there is slack in the run of tape between the recorder head and the transcriber head and to permit motion of the rotatable arm as the run of tape between the recorder head and the transcriber head tightens; and,
(c) switching means responsive to the motion of the rotatable arm sequentially to cause the recorder drive capstan to be engaged, the transcriber drive capstan to be disengaged and the recorder drive capstan to be disengaged.

4. A tape transport having a continuous loop of magnetic flexible tape;

a base;
a recorder on the base including a recorder head for imparting magnetic impulses to the tape;
a recorder drive capstan and means for driving the recorder drive capstan;
a recorder brake post;
means for selectively bringing the tape into frictional engagement with either said recorder brake post or said recorder drive capstan; said means comprising:
a brake shoe positioned adjacent said recorder brake post;
a roller positioned adjacent said recorder drive capstan;
a recorder yoke supported by leaf springs and journalling said recorder drive capstan roller and said brake shoe; and
means for shifting the yoke to selectively force either said brake shoe into engagement with said recorder brake post or said recorder drive capstan roller into engagement with said recorder drive capstan;
a transcriber on the base including a transcribing head for sensing magnetic signals on the tape;
a transcriber drive capstan and means for driving the transcriber drive capstan;
a transcriber brake post; and
means for selectively bringing the tape into frictional engagement with said transcriber brake post or said transcriber drive capstan.

5. A tape transport according to claim 4 wherein said leaf springs are U-shaped and the yoke is supported from one arm of each of the U-shaped leaf springs.

6. In a tape transport having a base, a magnetically sensible head on the base for imparting data to or receiving data from a magnetic tape, a drive capstan on the base for pulling the tape through the head, and a brake post for stopping the tape; means for selectively engaging the tape with said drive capstan or said brake post, said means comprising:

a yoke flexibly supported from said base by leaf springs mounted on opposite ends of said yoke;

roller means mounted in respective opposite ends of said yoke adjacent respective leaf springs; and means for selectively shifting said yoke to bring selected roller means into engagement with said drive capstan or said brake post.

7. A tape transport according to claim 6 wherein said yoke is mounted substantially parallel to said base and is flexible in the plane of said base.

References Cited

UNITED STATES PATENTS

| | | | |
|---|---|---|---|
| 2,898,995 | 8/1959 | Funnell | 226—145 |
| 3,041,417 | 6/1962 | Stroud et al. | 179—100.2 |
| 3,310,791 | 3/1967 | Fisher | 179—100.2 |

FOREIGN PATENTS

| | | |
|---|---|---|
| 685,032 | 12/1952 | Great Britain. |
| 958,817 | 5/1964 | Great Britain. |

BERNARD KONICK, *Primary Examiner.*

J. R. GOUDEAU, *Assistant Examiner.*